Figure 1:
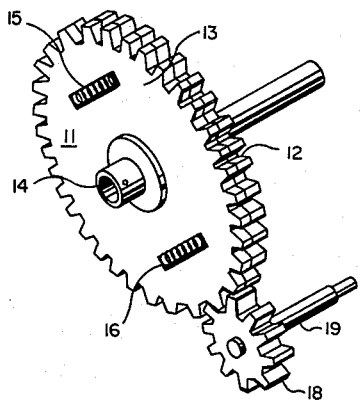

March 23, 1965    G. W. MICHALEC    3,174,356
VARIABLE SPRING-LOADED ANTIBACKLASH GEAR DRIVE
Filed July 11, 1963

INVENTOR.
GEO. W. MICHALEC
BY
ATTORNEY

United States Patent Office 3,174,356
Patented Mar. 23, 1965

3,174,356
VARIABLE SPRING-LOADED ANTI-
BACKLASH GEAR DRIVE
George W. Michalec, Pleasantville, N.Y., assignor to
General Precision, Inc., a corporation of Delaware
Filed July 11, 1963, Ser. No. 294,334
4 Claims. (Cl. 74—440)

This invention relates to gear drives and more particularly to gear drives of limited rotation in which backlash cannot be tolerated.

Conventional scissor type antibacklash gear drives, due to the constantly spring-loaded teeth, have a limited life and practical maximum load application. They are, therefore, not suitable for driving loads which vary as a known repetitive function over a limited gear rotation such as is commonly found in cam and linkage drives. Thus in the regions of little or no external load the large spring-loading forces necessary in the regions of maximum external load cause excessive wear. This unnecessary wear is greatly magnified in servo drives where the bulk of the operation centers about the light or no-load region.

One object of this invention is to provide an antibacklash gear drive of the scissor type which is suitable for driving a load that varies as a known repetitive function over a limited gear rotation.

Another object of the invention is to provide a scissor type antibacklash gear drive in which the spring-loading of the split gear varies as a predetermined repetitive function over a limited gear rotation.

Yet another object of the invention is to provide an antibacklash gear drive of the scissor type which is not subject to excessive wear due to spring-loading during light or no-load operation.

The invention contemplates a scissor type antibacklash gear drive in which the two geared elements comprising the scissor gear have different numbers of teeth meshing with the same common pinion; whereby relative movement between the two halves of the scissor gear causes the spring-loading of the teeth of the scissor gear to vary as a predetermined function of the pinion rotation.

The foregoing and other objects and advantages of the invention will become more apparent from a consideration of the drawings and specification wherein one embodiment of the invention is shown and described in detail for illustration purposes only.

Figure 2:
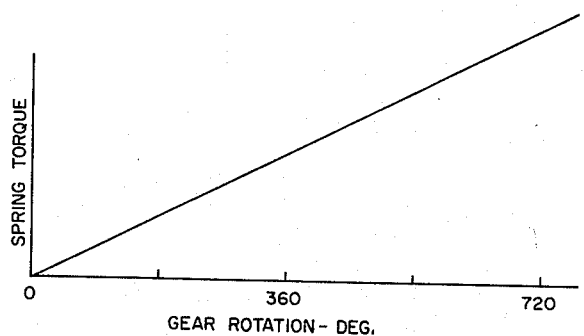
Figure 3:
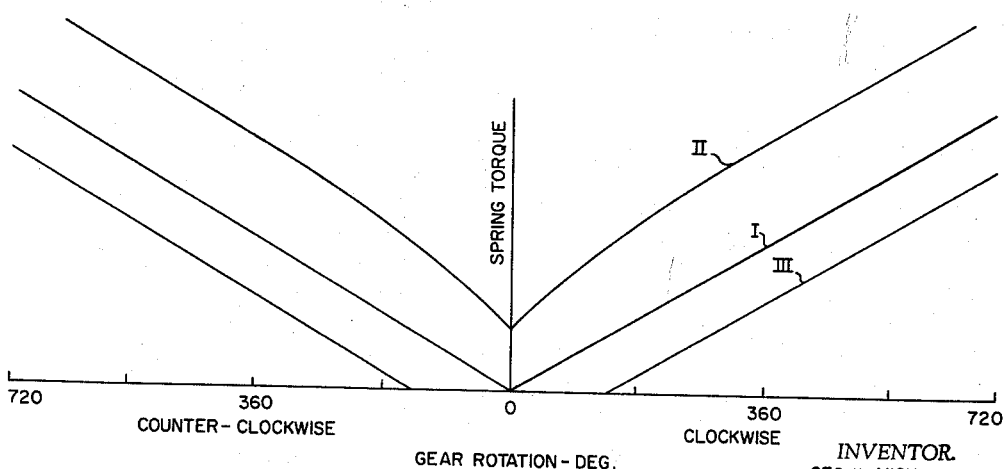

In the drawings:

FIGURE 1 is an isometric drawing of a novel scissor type antibacklash gear drive constructed in accordance with the invention; and FIGURES 2 and 3 are graphs illustrating the operation of the structure shown in FIGURE 1.

In FIGURE 1 a scissor gear 11 includes a fixed gear 12 and a free gear 13. Gear 13 has N teeth while gear 12 has N—X teeth where X may range from 1 to about 5 and will influence the maximum possible rotation of gear 11 in any one direction. A shaft hub 14 is attached to a fixed gear 12 and supports free gear 13.

A pair of springs 15 and 16 interconnect gears 12 and 13. The manner in which the springs are interconnected to the separate gears is old and well known to those skilled in the art and forms no part of the invention. For example, an interconnecting arrangement such as disclosed in the patent to English et al., No. 2,607,238, or that disclosed in the patent to Larsen, No. 2,440,901, may be utilized. The springs are arranged so that spring 15 is loaded and spring 16 is unloaded when the gears are turned oppositely in one sense and spring 15 is unloaded while spring 16 is loaded when the rotational sense referred to above is reversed. More than one pair of springs may be employed if desired or necessary. Thus, the characteristics of the spring-loading, which will be described in greater detail later, may be varied over a considerable range.

A pinion gear 18 mounted for rotation on a shaft 19 meshes with scissor gear 11 which in turn drives hub 14 which may be connected to a desired load for driving the same in response to the rotational movement of shaft 19.

The limited life and practical maximum load application, due to constantly spring-loaded teeth, can be improved significantly for special cases where the transmitted load varies as a known repetitive function over a limited gear rotation. In such a case the typical scissor gear 11 can be made with different numbers of teeth in each of its halves meshing with the same common pinion 18, by profile-shift design of one gear. This special scissor gear has no obvious outward differing appearance from the usual gear. However, as this gear is rotated in mesh the small relative motion between the gear halves, due to different numbers of teeth, will cause the spring-loading to vary as plotted in FIGURE 2. By choice of a proper spring-constant, pre-load and differential number of teeth the variable spring force can be matched to the varying transmitted load. This offers the unique feature of only spring-loading the teeth to the amount called for in accordance with the actual work to be done, and in this manner can vastly prolong gear life.

If the drive is to be bidirectional with the load increasing either side of a central position, the spring-loading can be made such that one spring 15, or more if need be, is loaded and the other 16 remains unloaded in one direction of drive, and the opposite action when the drive is reversed through the central position. The variable load curve is plotted in FIGURE 3, Curve I. If pre-loading at the center position is desired, the springs can be accordingly loaded and assembled; however, the response will not be exactly linear due to the bucking effect around the central position. See FIGURE 3, Curve II. If for any special reason a central low-friction, non-spring-loaded range is desired, the springs can be designed inactive over the desired rotation, resulting in interrupted spring-loading, shown by Curve III.

In FIGURES 2 and 3 the curves drawn illustrate spring torque as a function of gear rotation for linear springs. However, the invention is not limited to the use of linear springs and if necessary or desirable non-linear springs may be used to match a particular load function. Furthermore the bidirectional spring loading need not be symmetric as shown in FIGURE 3 since the portion of each curve to the right of the zero or center position is a function of one spring such as 15 while that portion of each curve to the left is a function of the other spring, i.e., 16.

It is possible to provide a bidirectional drive without the opposing dual spring design in special cases. If for example, a load constantly maintains the same tooth profile sides in intimate contact, on each side of a central position, such as might be found in lifting a pendulous weight clockwise or counterclockwise, then a scissor gear with a single spring will be quite satisfactory.

With the arrangements described above spring-loading and resultant gear wear can be drastically reduced over gear positions where it is not needed. This provides prolonged life and improved reliability for devices which predominately operate in a central light-load or no-load region. Drives employing the novel antibacklash device are quite suitable for driving horizontally stabilized unbalanced or pendulous airborne antennas which are subjected to pitch, roll and horizontal acceleration and a wide variety of other similar devices.

The novel variable spring-loaded drive is only applicable to gear meshes with limited rotation, which may be a fraction of a turn or several rotations. However, the train must have a specific range limit, preferably established by physical stops associated with the connected load, since the maximum range of operation is established by how much relative motion the loading springs can accommodate and motion beyond that point would result in damage to the gear train.

While only one embodiment of the invention has been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:

1. A scissor gear for use in an antibacklash gear drive comprising,
   a first gear having a predetermined number of teeth,
   a second gear having a different number of teeth than the first gear mounted alongside said first gear and rotatably supported on the same center with respect to said first gear, and
   spring means interconnecting said first and second gears whereby variable unidirectional spring-loading is provided as a function of differential rotation of the two gears when driven by a common pinion gear within a predetermined range.

2. A split gear type antibacklash gear drive comprising,
   a split gear in which each half has a different number of teeth,
   a pinion gear in mesh with said split gear,
   and spring means engaging the said two halves of the split gear and arranged to exert a force tending to drive the gear in opposite directions when loaded,
   said spring-loading force varying over a predetermined range as a function of pinion gear rotation due to the differential rotation of the split gear halves.

3. A scissor gear for use in an antibacklash gear drive comprising,
   a first gear having a predetermined number of teeth,
   a second gear having a different number of teeth than the first gear mounted alongside said first gear and rotatably supported on the same center,
   first spring means interconnecting said first and second gears to provide a first variable unidirectional spring-loading which varies as a first function of the differential rotation of the two gears when driven by a common pinion gear within a first predetermined range, and
   second spring means interconnecting said first and second gears to provide a second variable unidirectional spring-loading which varies as a second function of the differential rotation of the two gears when driven by a common pinion gear within a second predetermined range.

4. A split gear type antibacklash gear drive comprising,
   a split gear in which each half has a different number of teeth,
   a pinion gear in mesh with said split gear,
   first spring means engaging the said two halves of the split gear for exerting a counter rotational force thereon when loaded, and
   second spring means engaging the said halves for exerting an opposite counter rotational force thereon when loaded, said spring-loading forces resulting from said first and second spring means each varying over a different predetermined range of pinion rotation as a function of the pinion rotation which causes differential rotation of the split gear halves.

No references cited.

DON A. WAITE, *Primary Examiner.*